Figure 1:
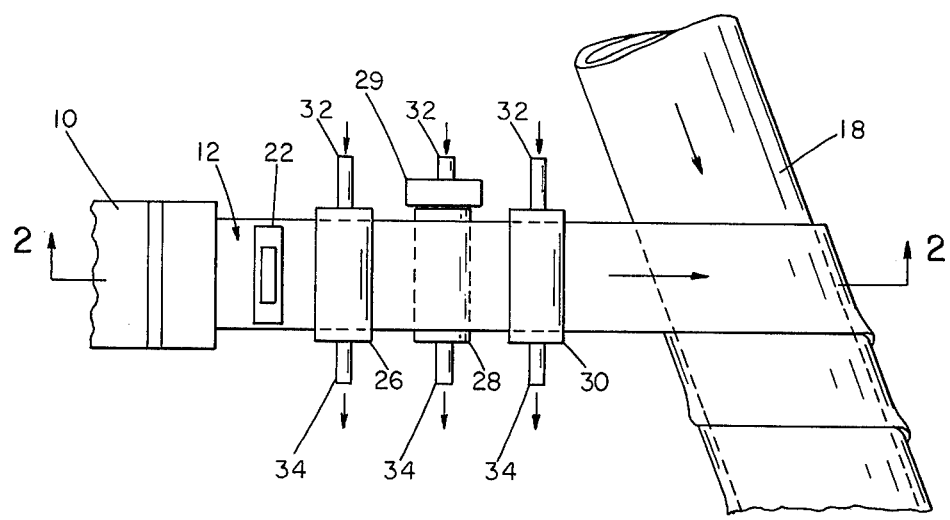

United States Patent [19]

Hollister

[11] 4,130,453
[45] Dec. 19, 1978

[54] PIPE COATING METHOD AND APPARATUS

[75] Inventor: John H. Hollister, Acton, Mass.

[73] Assignee: The Kendall Company, Boston, Mass.

[21] Appl. No.: 819,973

[22] Filed: Jul. 28, 1977

[51] Int. Cl.² .............................................. B29C 19/00
[52] U.S. Cl. ..................... 156/187; 156/229; 156/244.15; 156/429; 156/446; 156/495; 156/498
[58] Field of Search ................ 156/187, 188, 195, 392, 156/498, 495, 229, 244, 500, 501; 264/210 R, 281

[56] References Cited

U.S. PATENT DOCUMENTS

| | | | |
|---|---|---|---|
| 2,700,631 | 1/1955 | Ferguson | 156/188 |
| 3,400,029 | 9/1968 | Mesrobian | 156/82 |
| 3,499,072 | 3/1970 | Helling et al. | 264/281 X |
| 3,616,006 | 10/1971 | Landgraf | 156/188 |
| 3,682,730 | 8/1972 | Haase | 156/229 X |
| 3,762,125 | 10/1973 | Prena | 156/495 X |
| 3,802,908 | 4/1974 | Emmons | 156/188 X |
| 3,823,045 | 7/1974 | Hielema | 156/244 X |
| 3,959,432 | 5/1976 | Wiley | 156/244 X |
| 3,972,761 | 8/1976 | Landgraf | 156/195 |
| 4,010,054 | 3/1977 | Bradt | 156/244 X |

Primary Examiner—David A. Simmons

[57] ABSTRACT

Pipe is coated by extruding a band of heat-softened thermoplastic, cooling the band and passing it through tension-isolating snubber rolls then applying it to the surface of the rotating, advancing pipe under tension, and controlling the tension isolating snubber rolls and rate of movement of the pipe surface with respect to the rate of extrusion to provide substantially controlled tension on the band between the extruder and the tension isolating means and to provide a second, higher tension on the band between the tension isolating means and contact of the band with the pipe surface.

16 Claims, 2 Drawing Figures

PIPE COATING METHOD AND APPARATUS

This invention relates to a method and apparatus for applying protective coating to pipe.

It has previously been proposed to apply protective thermoplastic coating to metal pipe by first extruding a band of heat-softened adhesive and wrapping it helically about a pipe, either heated or unheated, followed by extruding a second band of protective thermoplastic material and helically wrapping it with an overlap in one or more layers over the adhesive coating as described in U.S. Pat. Nos. Landgraf 3,616,006, Emmons 3,802,908 and Hielema 3,823,045. It has also been proposed to omit the adhesive and apply the extruded band of protective thermoplastic material directly to heated pipe as described in U.S. Pat. No. Ferguson et al. 2,700,631. It has further been proposed, in the manufacture of spiral wound tubular containers by wrapping multiple adhesive coated webs upon a mandrel, to employ tension controllers as described in U.S. Pat. No. Mesrobian et al. 3,400,029.

In the foregoing processes for coating pipe, an extruded band of thermoplastic protective material must be applied to the pipe surface at very low tension because of the molten fluid nature of the material as it emerges from the extruder die orifice. Even when the tension is kept low, the dimensions of the extruded band are usually reduced between the extruder die orifice and the pipe surface because of stretching and flow of the band, and minor variations in the speed of extrusion or in the speed of rotation or advance of the pipe with respect to the extruder tend to cause non-uniformity in the finished product in the form of thin or weak spots.

It is now proposed to improve the uniformity of extruded pipe coatings without loss of other advantages of the coating process by cooling at least one side of the extruded band as it leaves the die orifice to decrease its fluidity and hence increase its tensile strength and decrease its tendency to stretch or elongate under tension, then passing the band through tension isolating means to retard the advance of the band toward the pipe surface toward which it is pulled by the rotational and advancing movement of the pipe with respect to the extruder. The portion of the heat-softened thermoplastic band immediately adjacent the extruder (between the extruder and the tension isolating means) is highly fluid and has low tensile strength; however, because of the tension isolating means, the tension applied to this portion of the band by rotation and advance of the pipe is maintained at a controlled value; in a preferred embodiment in which the extruded band is in the form of a composite sheet formed by coextrusion of a layer of thermoplastic adhesive and a layer of protective thermoplastic, the tension applied to the portion of the extruded band immediately adjacent the extruder is maintained sufficiently low so that stretching or elongation of this portion of the band (with accompanying reduction in cross-sectional area) is less than 5%. In other embodiments in which the layer of protective thermoplastic is extruded individually, separate from any other material, for application to a pipe which has separately been coated with suitable adhesive, it may be desirable to control the tension so that stretching or elongation of the portion of the band immediately adjacent the extruder is many times greater than 5% In every case, however, the present invention provides for maintaining a controlled, preferably substantially constant and unchanging tension upon the portion of the extruded band immediately adjacent the extruder so that the band, as it passes through the tension isolating means, maintains uniformity of properties and dimensions. The cooling of the band which occurs either before or during passage of the band through the tension isolating means decreases the fluidity of the band and increases its tensile strength so that the maintenance of considerably higher tension on the portion of the band (whether coextruded or not) between the tension isolating means and the point of application to the pipe is provided. The higher tension maintained upon the latter portion of the band improves close contact between the extruded band and the surface of the pipe particularly adjacent surface irregularities in the pipe such as weld lines, and, in the case of an overlapping spiral wrap, adjacent the margin of the underlying band, where bridging of the extruded band tends to occur to form a spiral void when the tension is low. The close contact improves the bonding of the band to the pipe whether or not the pipe surface is previously coated with adhesive. The higher tension maintained on the latter portion of the band between the tension isolating means and the contact of the band with the pipe surface is preferably limited to a value less than that at the yield point of the band. The yield point is that point on the stress-strain curve at which, as strain increases, there is a decrease in stress.

In one preferred embodiment, the extruded band is in the form of a composite sheet having at one surface at least one layer comprising heat-softened thermoplastic adhesive and at the other surface at least one layer comprising heat-softened protective thermoplastic. In a still further preferred embodiment, the composite sheet is formed by coextrusion of the layer of thermoplastic adhesive and the layer of protective thermoplastic. By coextrusion is meant the well-known process of simultaneous extrusion of two or more different thermoplastics into a multi-layered composite sheet as described, for example, in TAPPI MONOGRAPH REPORT No. CA-43, Chapter 6 (1973). The composite sheet is formed either immediately before or immediately after (within a fraction of an inch) coextrusion from the die orifice.

A feature of the invention is tension-isolating means in the form of a plurality of snubber rolls about which the extruded band passes, at least one of the snubber rolls being provided with a brake or drag or with a constant but adjustable speed positive drive or with any other suitable means for controlling the speed of advance of that portion of the band in contact with the tension-isolating means. Another feature of the invention is the provision of cooling either by supplying a stream of a cooling fluid or liquid to the interior of one or more of the snubber rolls or by supplying a stream of cooling air directed against a surface of the extruded band before it reaches the tension isolating means or during its passage through the tension isolating means; if desired, cooling can be accomplished both through the interior of the snubber rolls and by a stream of air.

Figure 2:
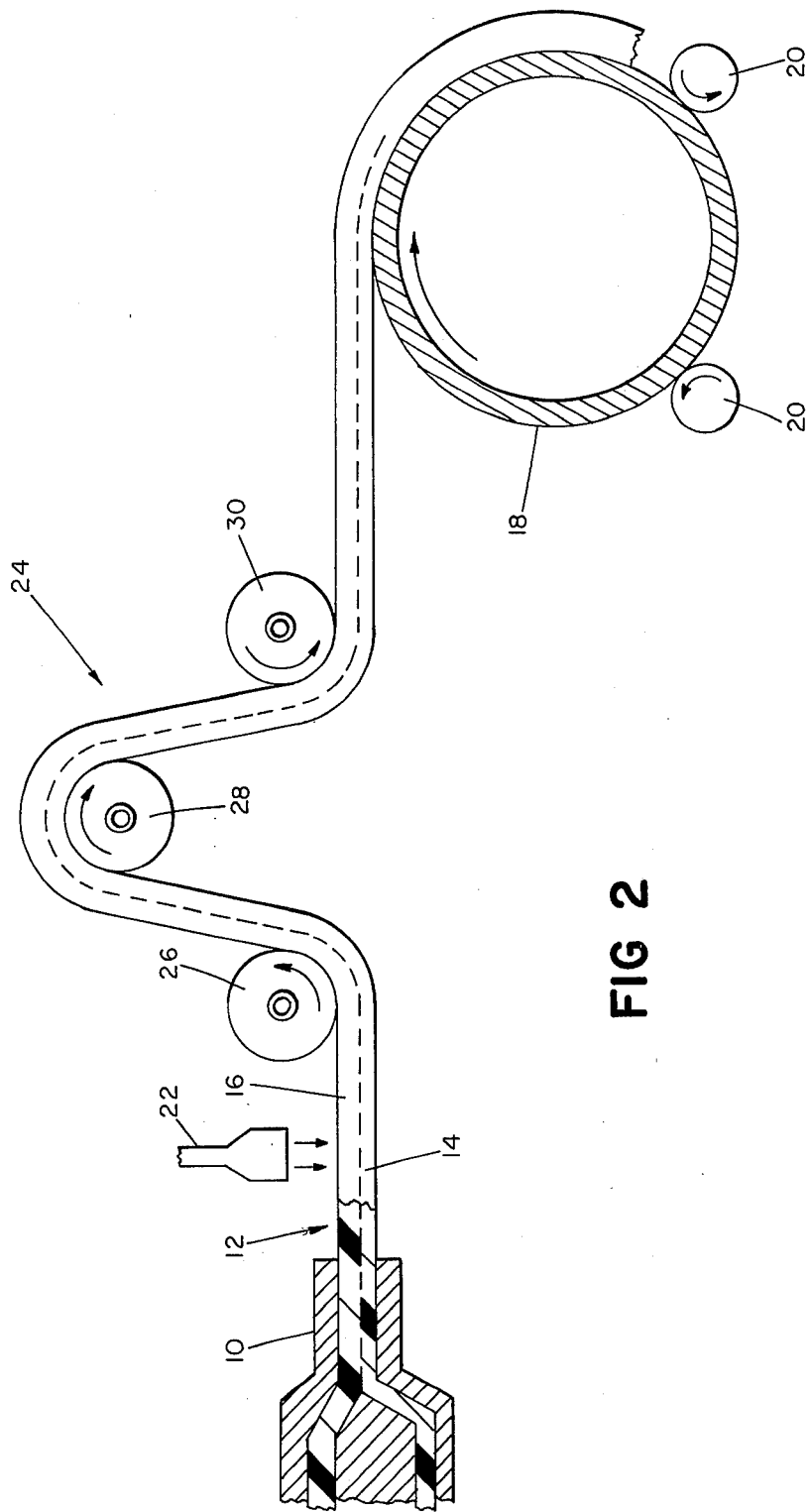

In the drawing:

FIG. 1 is a plan view partly broken away showing an embodiment of the invention; and, FIG. 2 is a view in section taken along lines 2—2 of FIG. 1.

As shown in the drawings, extruder die 10 is provided for coextruding a band or composite sheet 12 having at its lower surface at least one layer comprising heat-softened thermoplastic adhesive 14 and at its upper surface at least one layer comprising heat-softened protective thermoplastic 16. Band 12 as it leaves extruder die 10 is in a molten highly fluid condition possessing low tensile strength. It will be understood that two separate extruders and dies, one each for adhesive 14 and for protective thermoplastic 16, can be used if desired in place of a single extruder and die, the separate extrusions being combined before application to the pipe. Steel pipe 18 which is to be coated is mounted upon supporting rolls 20,20 driven by any suitable means (not shown) so as to rotate the pipe in clockwise direction about its axis as seen in FIG. 2 while the pipe is simultaneously advanced along its axis in the direction indicated by the arrow in FIG. 1.

Duct 22 is provided to direct a stream of cooling air from any suitable source (not shown) onto the upper surface of composite sheet 12, thus cooling it to reduce its fluidity and increase its tensile strength as it leaves the extruder 10.

Tension isolating means 24 is provided in the form of three snubbing rolls 26,28,30, each being mounted for rotation on suitable bearings (not shown). At least one of the rolls, preferably roll 28, is provided with a brake 29. In addition, if desired, at least roll 26 can be positively driven by any suitable means (not shown) at a controlled constant but adjustable speed and roll 28 can similarly be provided with a controlled constant but adjustable speed drive in place of brake 29, as can roll 30 as well. Each of rolls 26,28,30 is hollow and is provided with inlet pipe 32 at one end and outlet pipe 34 at the other through which a flow of cooling fluid, either gaseous or, preferably, liquid may be provided to achieve cooling of composite sheet 12. In some cases, it may be desirable to leave snubbing roll 28 uncooled or even to provide a supply of heated fluid through it in order to maintain layer 14 of adhesive thermoplastic in a highly adhesive condition while at the same time cooling layer 16 of protective thermoplastic so as to decrease its fluidity and increase its tensile strength and yield point.

In carrying out the process, the composite sheet 12 is coextruded at a controlled rate of speed and pipe 18 is simultaneously rotated about its axis and advanced along its axis with respect to extruder 10 so that the movement of the pipe surface pulls the composite sheet through tension isolating means 24 from the extruder 12. At the same time, cooling fluid is passed through nozzle 22 or through one or more of snubbing rolls 26,28,30 in order to cool the composite sheet and reduce its fluidity. If desired, cooling fluid may be passed simultaneously through both nozzle 22 and through one or more of the snubbing rolls 26,28,30. The temperature of at least layer 16 of composite sheet 12 is lowered to approximately room temperature (i.e., to a temperature from 40° to 100° F.). Because snubbing rolls 26,28,30 form a tension isolating means, the tension applied to composite sheet 12 between extruder 10 and the first snubbing roll 26 is maintained substantially constant at a value such that a controlled stretching of the band occurs therebetween, preferably so that the elongation imparted to the band is less than 5%. At the same time, the tension applied to the portion of band 12 between snubbing roll 30 and the point of contact of the band with pipe 18 is maintained at a value substantially higher than the tension on the first portion, but below the yield point of the band, so that the elongation occurring as a result of this tension is elastic, not permanent. Since the yield point of thermoplastic varies with temperature, the maximum tension which can be applied varies depending upon the temperature of the band as well as upon the identity of the particular thermoplastic. The higher tension applied to the band between the tension isolating means and the contact of the band with the pipe surface is also preferably controlled so as to be substantially constant, although it can be adjusted over a range of values, as can be the value of the first tension applied between the point of extrusion and the tension isolating means. The higher tension applied to the band at the point of contact with pipe 18 provides improved contact between the band and the pipe and promotes good adhesion to the pipe.

Pipe 18 need not be heated but should be clean and dry for best results. If the pipe is stored outdoors, as is conventional, especially in the case of large diameter pipe, it may be covered with rain, dew or frost which should be removed before coating. The removal is most conveniently accomplished by heating the pipe to vaporize the material and such heating has no deleterious effect upon the coating. Excessively high temperatures of the pipe are undesirable because they delay the setting of the coating and render the coating vulnerable to displacement until setting is complete, and excessively low temperatures are also undesirable since they inhibit the adhesive layer from developing optimum flow and bonding to the pipe. The pipe temperature desired in any particular case varies to a great extent depending upon the nature of the adhesive layer and the temperature at which it is extruded ranging from below room temperature to temperatures substantially above room temperature. Preferred pipe temperatures are below 100° C. but at or above ambient temperature.

The thermoplastic adhesive may be any of those compositions conventionally employed for adhesion to metal surfaces such as steel and may be a single material or a mixture of two or more different materials; among suitable materials are an ethylene-vinyl acetate copolymer, an ethylene-ethyl acrylate copolymer, and natural and synthetic rubber compositions tackified with appropriate tackifying agents. The protective thermoplastic layer may be any conventional tough and tear resistant material which is heat softenable and extrudable in the same range of temperatures as the thermoplastic adhesive and which has a higher yield point, i.e., requires a higher load to reach its yield point, than does the thermoplastic adhesive; polyolefins such as polyethylene and polypropylene are preferred, but polyvinyl chloride, acrylonitrilebutadiene-styrene interpolymers, polymers and copolymers of vinylidene fluoride, polymers and copolymers of chlorotrifluoroethylene, and polyolefin ionomers such as copolymers of ethylene with acrylic acid partly neutralized with sodium, zinc or magnesium can also be used.

Snubbing rolls 26,28,30 may be provided with a coating of an abhesive material such as silicone resin or polytetrafluoroethylene if desired in order to reduce any tendency for the composite sheet to stick to the surface of the rolls. It is particularly desirable for the surface of roll 28, which comes into contact with adhesive layer 14, to be coated with adhesive material. It is desired to control the speed of rotation and advance of pipe 18 with respect to the rate of extrusion of composite sheet 12 from extruder 10 so as to maintain the tension on the composite sheet at as high a value as possible at the point of contact of the composite sheet with pipe 18. In practice, in the case of a protective thermoplastic layer 16 composed of polyethylene having a thickness of 0.012 inch and a temperature from 15° to 75° C. between tension isolating means 24 and its contact with the pipe, the tension at the point of contact can be as much as 25 lb/inch width of sheet 12, but preferably is from 5 to 15 lb/inch width. The higher the temperature, the lower the tension must be, and in general this temperature can be from 10° to 95° C., but temperature of the adhesive layer 14 must be sufficiently high to provide adequate adhesion.

The thickness or gauge of the composite sheet 12 can be varied at will from about 7 mils to about 120 mils of which the thickness of the thermoplastic adhesive layer 14 may vary from 2 to 25 mils and the thickness of the protective thermoplastic layer 16 from 5 to 118 mils. Preferably the thickness of the adhesive layer is no more than half the total thickness of the composite sheet, usually from 5 to 30% of the total thickness, depending on the total thickness of the composite sheet which in turn varies depending upon pipe diameter and the extent of impact resistance desired in the finished coated pipe.

The extent of overlap of adjacent turns of band 12 on the surface of pipe 18 may be adjusted to any desired value. When the extent of overlap is 50%, the finished coating has twice the thickness of composite sheet 12 and by employing a greater extent of overlap, even greater total thicknesses of coating can be applied.

Since pipe 18 need not be heated and normally is at or slightly above room temperature or ambient temperature at the time the heat-softened sheet is applied, the sheet cools fairly rapidly as soon as it comes into contact with the surface of the pipe to form a coating having thermoplastic protective outer surface ahesively bonded to the pipe surface. It may also be desirable to provide cooling as by a stream of cold air at or after the point of application to the pipe so that the pipe can be handled without damage immediately after the coating is complete.

In order to ensure sealing of the seam, particularly at butt joint, it is also possible as an optional feature to apply over the helical seam, as an additional step, a ribbon or tape comprising a heat-shrinkable thermoplastic material such as oriented polyethylene, polyvinyl chloride, polypropylene containing rubber such as ethylene-propylene rubber or the like. A heat source such as an infrared heater or a flame may be provided to heat the tape after it has been applied to cause it to shrink about the coated pipe along the seam, and the coated pipe may be cooled to room temperature before or after applying and shrinking the tape in place. The ribbon or tape may also be a molten extrusion of the same composition as the outer coating layer 16, in which case no heat source is needed at the point of application.

What is claimed is:
1. Method of coating pipe which comprises
   forming by extrusion a band of heat-softened thermoplastic,
   cooling at least one surface of said band to decrease its fluidity and passing said cooled band through tension isolating means, and applying the surface of said band to the surface of said pipe while simultaneously rotating said pipe about its axis and advancing said pipe along its axis with respect to the point of extrusion to wrap said band helically about said pipe and to pull said band from said tension isolating means, said band being self-supporting and being maintained free from contact with external surfaces between said tension isolating means and said pipe surface and
   controlling said tension isolating means and the rate of rotation and advance of said pipe with respect to the rate of extrusion to maintain a first tension on said band between the point of extrusion and the point of contact with the tension isolating means at substantially constant value and to maintain a second tension on said band between said tension isolating means and the contact of said band with said pipe surface at a value substantially higher than said first tension.
2. The method as claimed in claim 1 in which said second tension is maintained lower than the yield point of said band between the tension isolating means and the contact of the band with the pipe surface.
3. Method of coating pipe which comprises
   forming by coextrusion at elevated temperature a composite sheet having at one surface at least one layer comprising heat-softened thermoplastic adhesive and at the other surface at least one layer comprising heat-softened protective thermoplastic,
   cooling at least the layer at said other surface to decrease the fluidity of said composite sheet and passing said cooled composite sheet through tension isolating means,
   applying the adhesive surface of said composite sheet to the surface of said pipe while simultaneously rotating said pipe about its axis and advancing said pipe along its axis with respect to said point of extrusion to wrap said composite sheet helically about said pipe and to pull said sheet from said tension isolating means, said band being self-supporting and being maintained free from contact with external surfaces between said tension isolating means and said pipe surface and
   controlling said tension isolating means and the rate of rotation and advance of said pipe with respect to the rate of extrusion to maintain a first tension on said composite sheet between the point of extrusion and the point of contact with the tension isolating means at a substantially constant value sufficiently low so that stretching of said composite sheet is less than 5% therebetween, and to maintain a second tension on said sheet between said tension isolating means and the contact of the composite sheet with the pipe surface at a value substantially higher than said first tension.
4. The method as claimed in claim 3 in which said second tension is maintained lower than the yield point of said band between the tension isolating means and the contact of the band with the pipe surface.
5. The method as claimed in claim 1 in which the step of passing said composite sheet through tension isolating means comprises passing said sheet around a plurality of snubbing rolls.
6. The method as claimed in claim 1 in which said cooling step comprises blowing a stream of cooling air against said surface.
7. The method as claimed in claim 1 in which said cooling step comprises passing a cooling fluid through the interior of at least one of said snubbing rolls.
8. The method as claimed in claim 1 in which the step of passing said composite sheet through tension isolating means comprises passing said sheet around a plurality of snubbing rolls and in which said cooling step comprises blowing a stream of cooling air against said surface.

9. The method as claimed in claim 3 in which the step of passing said composite sheet through tension isolating means comprises passing said sheet around a plurality of snubbing rolls.

10. The method as claimed in claim 3 in which said cooling step comprises blowing a stream of cooling air against said surface.

11. The method as claimed in claim 3 in which said cooling step comprises passing a cooling fluid through the interior of at least one of said snubbing rolls.

12. The method as claimed in claim 3 in which the step of passing said composite sheet through tension isolating means comprises passing said sheet around a plurality of snubbing rolls and in which said cooling step comprises blowing a stream of cooling air against said surface.

13. Apparatus for coating pipe with a band of heat-softened thermoplastic which comprises means for extruding at elevated temperature a band of heat-softened thermoplastic, tension isolating means including means for cooling at least one surface of said band to decrease the fluidity of said band and for passing said cooled band through said tension isolating means, means for rotating said pipe about its axis and advancing said pipe along its axis with respect to said extruding means, means for controlling said tension isolating means and the rate of rotation and advance of the pipe with respect to the rate of extrusion to maintain a first substantially constant tension upon said band between said extruder and said tension isolating means and to maintain a second tension higher than the first on the band between the tension isolating means and the pipe surface, said second tension being the sole force applied to said band at the time said band comes into contact with said pipe.

14. Apparatus as claimed in claim 13 in which said tension isolating means includes a plurality of snubbing rolls.

15. Apparatus as claimed in claim 14 in which said cooling means comprises means for blowing a stream of cooling air against said surface.

16. Apparatus as claimed in claim 14 in which said cooling means comprises means for passing a stream of cooling fluid through the interior of at least one of said snubbing rolls.

* * * * *